T. P. CLARK.
PIPE TAP.
APPLICATION FILED AUG. 9, 1915.
1,294,052.
Patented Feb. 11, 1919.
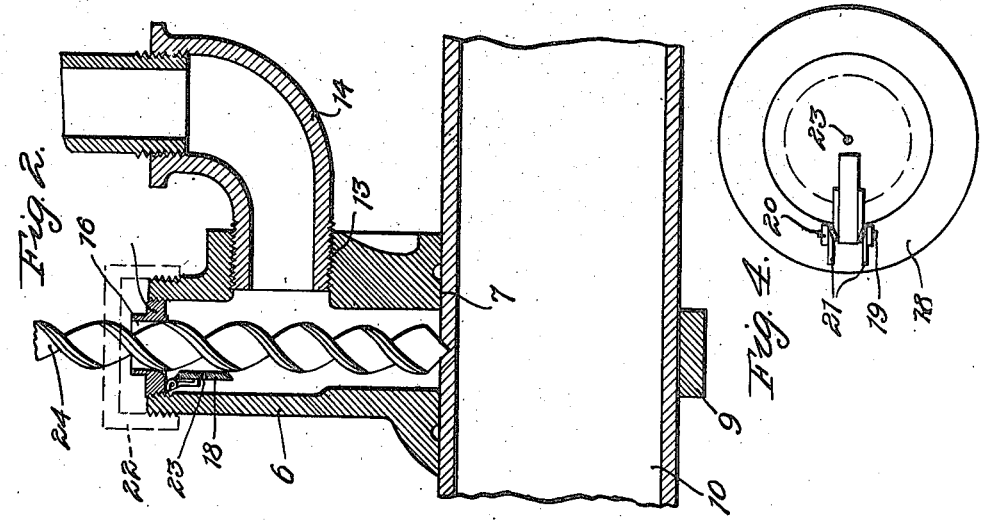
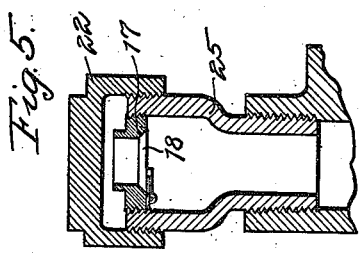
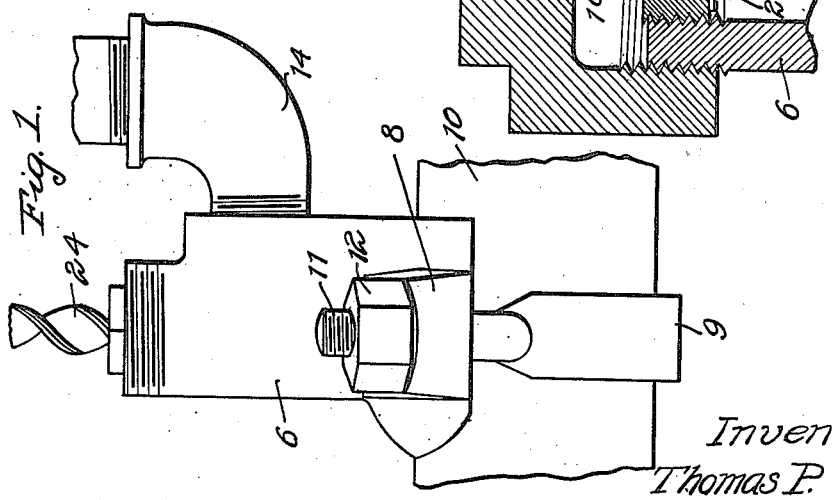
Inventor
Thomas P. Clark
By Brown, Hanson & Boettcher
Attorneys.

UNITED STATES PATENT OFFICE.

THOMAS P. CLARK, OF HIGHLAND PARK, ILLINOIS.

PIPE-TAP.

1,294,052.

Specification of Letters Patent.

Patented Feb. 11, 1919.

Application filed August 9, 1915. Serial No. 44,419.

*To all whom it may concern:*

Be it known that I, THOMAS P. CLARK, a citizen of the United States, residing at Highland Park, in the county of Lake and State of Illinois, have invented a certain new and useful Improvement in Pipe-Taps, of which the following is a full, clear, concise, and exact description, reference being had to the accompanying drawings, forming a part of this specification.

My invention relates to pipe taps and has for its object the provision of a device whereby a pipe line carrying a fluid under pressure may readily be tapped and supplied with a branch pipe without the loss of any of the fluid carried by the line.

It is a further object of my invention to provide a simple and durable device, as well as a safe one, and to these ends various features of my invention are made ancillary to the main and most important feature thereof.

My invention is applicable to any pipe line which carries fluid under pressure, such as a gas system, a water system, an ammonia system, or a compressed air system.

My invention is illustrated in the accompanying drawings in which—

Figure 1 is a side elevational view thereof showing its application to a pipe line;

Fig. 2 is a vertical axial sectional view thereof;

Fig. 3 is a vertical axial sectional view thereof, showing a part drawn on a larger scale;

Fig. 4 is an under side view of a valve to which I shall refer; and

Fig. 5 is a vertical axial sectional view of a slightly modified form of my invention.

Referring first to Figs. 1 to 4, inclusive, it will be seen that I provide a branch pipe member 6 which has an engaging surface 7 at right angles to its own axis, this engaging surface being specifically in the form herein shown in the nature of the engaging surface of a saddle 8 which, by means of a yoke 9 is firmly clamped down in engagement with a main pipe 10. It will be understood that this branch pipe member is thus mounted upon the main pipe at the point where the tap is desired. The yoke ends are screw-threaded as illustrated at 11 for the reception of clamping nuts, as indicated at 12. The branch member 6 is provided with a side outlet 13 which is internally screw-threaded for the reception of a pipe or elbow 14. The branch member itself is straight and at its top is provided with internal screw threads for the reception of a plug 15 provided with the central opening 16. The lower side of this central opening is in the shape of a valve seat 17 upon which a valve member 18 seats. This valve member is mounted upon a hinge pin 19 set in bosses 20, 20 extending downwardly from the plug 15, as illustrated, and a pair of light springs 21, 21 are provided to produce a tendency to close the valve if the valve should be in such position that gravity will not tend to close it. As will be later described the real influence which closes this valve and tends to keep it closed is the pressure within the branch member but I suggest the possibility of using these springs to make certain the positive and quick closing of the valve, as will be pointed out. The outside of the branch member 6, at the top thereof, is screw-threaded as illustrated for the reception of a cap 22.

I provide a very small by-pass from one side of the valve to the other, and in the specific form herein shown I provide this by-pass in the way of a vent through the valve itself, this vent being illustrated at 23. I shall describe the utility of this vent presently.

It will now be clear that when it is desired to tap the main pipe 10 the branch-member is clamped thereon in proper position and the side outlet-pipe 14 is permanently connected with the system which is to be supplied. A drill 24 is then passed downwardly through the opening 16 in the plug 15, the cap having not yet been applied, and the insertion of this drill opens the valve in case it is not already opened due to its own weight or natural position. As illustrated in Fig. 2, the pipe 10 is then drilled in perfect alinement with the branch-member, and the full communication between the main pipe and the system to be supplied is thus established. Just as soon as the opening has been completely bored, however, the drill is quickly withdrawn and the valve shuts. Depending upon the position of the valve, gravity may initiate or insure the closing movement of the valve, but I have supplied the springs which I illustrate so that the positive and quick closing of the valve may be insured regardless of the position thereof. As before noted, however, the main influence which closes this valve, and which may make the effect of the springs or gravity unnecessary, is the pressure which is produced in the branch member by the flood of fluid under pressure immediately the hole is formed. Obviously, this pressure will drive the valve to its seat and keep it there. After this point is reached the cap 22 is screwed in place and the installation is complete. Since, when the valve is new and properly fitted to its seat, no leak in the connection between the cap and the body of the branch-member can be detected, I provide the vent 23 which has been referred to, so that the fluid may get into the cap to afford testing the connection between the cap and the branch-member body, so as to make it secure. In this way, if at some later time the valve should rust or corrode, no serious result will ensue, the valve having already performed its function. Of course, the vent 23 is very small, so that the fluid which escapes therethrough is negligible. It will be seen that in this way the main pipe can readily be tapped without the issue into the air of the fluid under pressure, which is not only disconcerting but also involves a monetary loss.

In Fig. 5 I illustrate a fitting for general application, this fitting being in the form of a union 25, which can be applied to any of the standard branch-members now in use. The fitting carries the plug and valve precisely as in the manner described relative to the fitting 6, and is provided with external screw-threads for the reception of a cap.

I claim:

1. In a device of the character described, a hollow casing adapted to be clamped permanently upon a main to form a branch connection therewith, said casing having an opening therein provided with a guide for guiding a drill in the operation of tapping the main, the casing having a side opening for connection with a branch pipe, a valve within said casing controlling said drill opening and adapted to be seated by pressure within said casing, and means for permanently sealing the casing at the point through which the drill is inserted.

2. In a device of the character described, a hollow casing adapted to be clamped permanently upon a main to form a branch connection therewith, said casing having an opening therein provided with a guide for guiding a drill in the operation of tapping the main, the casing provided with a side opening for connection with a branch pipe, a flap valve within said casing controlling said drill opening and adapted to be seated by pressure within said casing, and a cap for permanently sealing the valve within said casing after the drill is removed.

3. In a device of the character described, a hollow casing adapted to be clamped permanently upon a main to form a branch connection therewith, said casing having an open end through which a drill can be inserted for drilling the main, said casing having a side opening for connection with a branch pipe, drill guide members having different sized guide holes adapted to be interchangeably mounted in said opening, a valve carried by each of said members for closing the guide hole therein and adapted to be seated by pressure within the casing, and means for sealing the guide member and valve within the casing after the drill is withdrawn.

4. In a pipe tap, a straight branch member having an engaging surface at an angle to its axis and adapted to be permanently secured to the main pipe, a side outlet for said member, said member having an opening in the end thereof for the reception of a union, said union being in axial alinement with said branch member, and having an opening in the end thereof for the reception of a drill, an automatically operated valve carried by said union controlling said last mentioned opening, and a cap fitting over the end of said union, there being a vent in said valve.

5. In a pipe tap, a straight branch member having an engaging surface at an angle to its axis, an opening in the end of said branch member for the reception of a drill, a side outlet for said member, an automatically operated valve controlling said opening, and a cap fitting over the end of said member, there being a vent in said valve.

6. In a pipe tap, a straight branch member having an engaging surface at an angle to its axis, an opening in the end of said branch member for the reception of a drill, a side outlet for said member, an automatically operated valve controlling said opening, and a cap fitting over the end of said member, there being a vent by-passing said valve.

In witness whereof, I hereunto subscribe my name this 5th day of August A. D. 1915.

THOMAS P. CLARK.